United States Patent
van Haalen et al.

(10) Patent No.: US 7,636,774 B2
(45) Date of Patent: Dec. 22, 2009

(54) METHOD AND APPARATUS FOR REBOOTING NETWORK BRIDGES

(75) Inventors: Ronald van Haalen, Nijmegen (NL); Arie Johannes de Heer, Hengelo (NL); Ronald de Man, Den Haag (NL); Gert H. Manhoudt, Hilversum (NL); Erik Tromp, Bergen (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1166 days.

(21) Appl. No.: 10/780,509

(22) Filed: Feb. 17, 2004

(65) Prior Publication Data

US 2005/0198232 A1    Sep. 8, 2005

(51) Int. Cl.
- G06F 15/177 (2006.01)
- G06F 11/00 (2006.01)
- H04L 12/28 (2006.01)

(52) U.S. Cl. ............... 709/221; 709/220; 370/229; 370/254; 370/256

(58) Field of Classification Search .......... 209/224, 209/207; 709/220–221, 225; 717/171; 370/216, 370/229, 254, 256
See application file for complete search history.

(56) References Cited

U.S. PATENT DOCUMENTS

| | | | |
|---|---|---|---|
| 6,611,502 B1 * | 8/2003 | Seaman ............ | 370/256 |
| 6,891,808 B2 * | 5/2005 | Ishii ............... | 370/256 |
| 7,355,983 B2 * | 4/2008 | Scudder et al. .... | 370/242 |
| 7,392,520 B2 * | 6/2008 | de Heer et al. .... | 717/171 |
| 7,483,370 B1 * | 1/2009 | Dayal et al. ....... | 370/219 |
| 2005/0135231 A1 * | 6/2005 | Bellovin ........... | 370/216 |

OTHER PUBLICATIONS

Scanning Tree (802.1d), Alcatel Executive Briefing, Sep. 2003, pp. 1-8.

Part 3: Media Access Control (MAC) Bridges—Amendment 2: Rapid Reconfiguration, IEEE Std. 802.1w-2001 [Amendment to IEEE Std. 802.1D, 1998 Edition (ISO/IEC 15802-3:1998) and IEEE Std. 8802.1t-2001], IEEE, 2001; pp. i-108.

IEEE Standards for Local and Metropolitan Area Networks; Virtual Bridged Local Area Networks; IEEE Std. 802.1Q, 2003 Edition [incorporates IEEE Std. 802.1Q-1998, IEEE Std. 802.1u-2001, IEEE Std. 802.1v-2001, and IEEE Std 802.1s-2002]; May 7, 2003, pp. 1-312.

(Continued)

*Primary Examiner*—Nathan J Flynn
*Assistant Examiner*—Joshua Joo
(74) *Attorney, Agent, or Firm*—Wall & Tong, LLP (57) ABSTRACT

Method and apparatus for rebooting a bridge in a network containing a plurality of bridges. The method includes sending notification to other bridges that the bridge will be updated; updating the bridge; restoring a state of the network prior to the bridge being updated; and sending notification to the other bridges in the network that the update is complete. Sending notification includes sending a special bridge protocol data unit along forwarding links connected to the bridge. The method further includes the other bridges initiating a condition of not expecting additional messages from the bridge subsequent to the notification of the update and disabling a part of the bridge prior to updating. An apparatus includes a forwarding plane adapted to provide physical control of ports in the bridge and a control plane adapted for issuing and executing instructions in accordance with the method that control the physical action of the ports.

25 Claims, 4 Drawing Sheets

OTHER PUBLICATIONS

IEEE Standard for Information Technology—Telecommunications and Information Exchange Between Systems—Local and Metropolitan Area Networks—Common Specifications, Part 3: Media Access Control (MAC) Bridges, ANSI/IEEE Std. 802.1D, 1998 Edition, pp. I, iv-263.

* cited by examiner

METHOD AND APPARATUS FOR REBOOTING NETWORK BRIDGES

FIELD OF INVENTION

The invention relates to the field of switched networks and, more specifically, to the interconnection of components within such switched networks by bridge components.

BACKGROUND OF INVENTION

Figure 1:
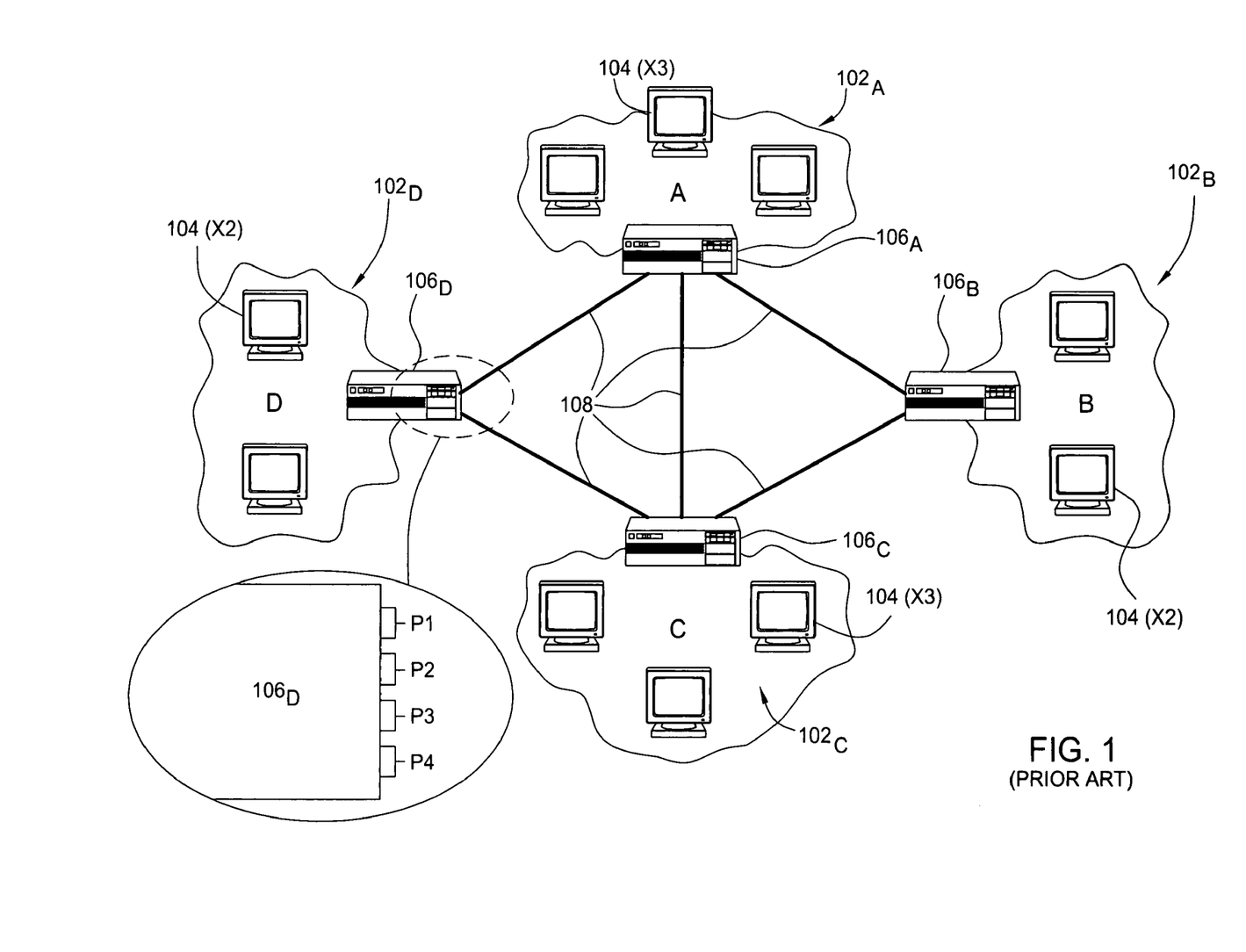
FIG. 1 depicts a prior art branched local area network.

Bridge components or bridges are components that are used to interconnect Local Area Networks (LANs). A bridge interconnects the LANs in such a way that one workstation within a first LAN can be reached by other stations connected in other LANs as though they were all connected to the same LAN. For example, FIG. 1 shows an existing bridged LAN network (BLN) 100. The BLN is made up of a plurality of LANs $102_{A-D}$. In this particular example, four LANs are shown labeled A, B, C and D. Each of the LANs contains at least one workstation 104. Each workstation 104 is connected to every other workstation and to a bridge component $106_{A-D}$ to allow communication within that particular LAN. Additionally, links 108 exist between each bridge 106 of each LAN 102 to enable data to be transferred between LANs in a substantially seamless manner.

As data moves through the network, there may be multiple paths the data may take to arrive at the same destination. To avoid the problem of loops being created in the network, various protocols have been devised to create a loop-free topology. In one existing example, bridges 106 execute a Spanning Tree Protocol (STP) which is explained in detail in IEEE 802.1D, herein incorporated in its entirety by reference. The STP determines for each port of a bridge whether such port should be placed in a blocking mode, where no traffic is accepted or sent by the port, or placed in a forwarding mode, where traffic may be sent and received by said port. By strategically blocking ports to certain links in accordance with the STP, loops are eliminated and the network runs in an efficient and loop free manner.

It is understood that in a sophisticated interconnection of various workstations 104 and LANs 102 to create the BLN 100, it is sometimes required to update the software on a bridge 106 to provide the best possible operating conditions within the BLN 100. Currently, updating of a bridge 106 requires all ports of the bridge (e.g., ports P1-P4 of bridge $106_D$) be put into a blocking state. By placing all ports P1-P4 in the blocking state, normal network traffic is not allowed to flow through the bridge thereby creating a temporary bottleneck in this portion of the BLN 100. Once all ports P1-P4 are placed in the blocking state, new software is installed into the bridge 106.

After the updating is completed, it is necessary to restart the protocol (e.g., the STP) to reestablish the loop free topology that existed prior to the bridge being taken "offline" (i.e., the ports being blocked). This procedure leads to two possible reconfigurations of the spanning tree. The first reconfiguration may occur before the restart, when the bridge blocks all its ports. This blocking of ports may lead to permanent loss of connectivity. The second reconfiguration may occur after the restart is completed, and the original connectivity is restored. Each reconfiguration influences the traffic in the network. Due to the reconfiguration, traffic may flood (i.e., be routed to all possible paths at all available bridges) which leads to an increased network load. Additionally, connectivity may be lost between users of the BLN 100 for a period of up to 50s (depending on the particular spanning tree protocol and the particular circumstances). As such, it is desirable to have a means and method for updating network bridges and subsequently re-establishing the original loop-free topology without causing reconfiguration of same or creating network congestion.

SUMMARY OF THE INVENTION

The disadvantages heretofore associated with the prior art are overcome by a novel method and apparatus for updating a first bridge in a network containing a plurality of bridges. A method according to one embodiment of the invention includes the steps of sending notification to one or more second bridges in the network that a first bridge is scheduled for updating; updating the first bridge; restoring a state of the network prior to the first bridge being updated; and sending notification to the one or more second bridges in the network that the updating of the first bridge has been completed. The step of sending notification includes the first bridge sending a special bridge protocol data unit (BPDU) along a plurality of forwarding links connected to the first bridge and the special BPDU is selected from the group consisting of a normal spanning tree protocol configuration and a rapid spanning tree protocol configuration. The method further includes the steps of the one or more second bridges initiating a condition of not expecting additional messages from the first bridge subsequent to the notification of first bridge updating and disabling a control plane of the first bridge just prior to commencement of the updating. In one embodiment, the method is practiced by a computer readable medium containing a program which, when executed, performs an operation of updating a first bridge in a network in accordance with the above-presented steps.

The invention also includes an apparatus for updating a network bridge in a plurality of interconnected network bridges. The apparatus includes a forwarding plane adapted to provide physical control of the states of a plurality of ports in the bridge and a control plane adapted for issuing and executing instructions that control the physical action of the forwarding plane. A set of instructions include sending notification to one or more second bridges in the network of the first bridge being scheduled for updating, updating the first network bridge, restoring a state of the network prior to the first bridge being updated and sending notification to the one or more second bridges that the updating of the first bridge has been completed. Accordingly, the method provides for a bridge that is updated and then capable of being re-introduced into the network as an active component therein without unnecessarily disturbing or otherwise causing the network to reconfigure itself to account for a loss of connectivity to the first bridge.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention provides a method for updating bridged components in a BLN as well as an apparatus operating in accordance with the method steps. The apparatus is an enhanced bridge component. Both the method and the apparatus provide for the upgrading of a network bridge and the re-establishment of the existing protocol prior to the update occurring. The invention is presented within the context of an Ethernet-based network configured and operating in a first state (i.e., via an STP); however, the invention can be practiced in any suitable context or network that can support the discussed protocols. Accordingly, the apparatus may be used in an exemplary telecommunications system or network such as the BLN 100 described in FIG. 1.

Figure 2:
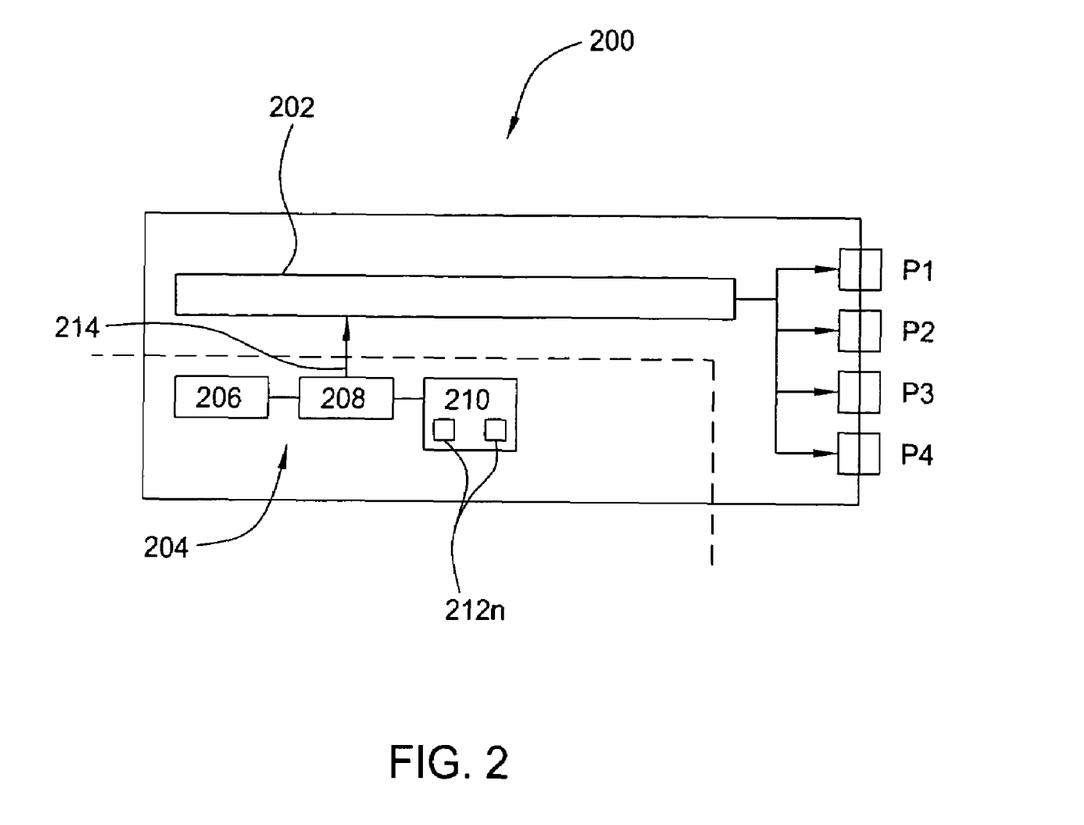
FIG. 2 depicts a bridge component for a BLN in accordance with the subject invention.

FIG. 2 depicts an exemplary bridge component 200 in accordance with an embodiment of the subject invention. The bridge component 200 comprises a plurality of ports P1, P2 ... Pn for receiving and sending data. In one embodiment, four ports P1-P4 are depicted, but one skilled in the art will understand any number of ports are possible based on known design and fabrication techniques and network configuration. The enhanced bridge 200 further comprises a forwarding plane section 202 which is responsible for forwarding frames of data, learning Media Access Control (MAC) addresses and the like and physically controls the states of ports (P1-P4) associated with the enhanced bridge component 200. The enhanced bridge component 200 also includes a control plane 204 for issuing and executing software instructions that control the forwarding plane 202. An example of a bridge component having the forwarding plane hardware and control mechanisms and a control plane operating according to implementations of IEEE 802.1D and w may be found in the Metropolis® AM device that is manufactured and sold by Lucent Technologies, Inc. of Murray Hill, N.J. Such bridge component 200 includes a GalNet®-3 GT-48510A Layer 2/3/4/5 Switched Ethernet Controller manufactured and sold by Marvell Semiconductor, Inc. of Sunnyvale, Calif. as the forwarding plane. The control plane 204 comprises a central processing unit (CPU) 208, support circuits 206, and memory 210. The CPU 208 may comprise one or more conventionally available microprocessors. The support circuits 206 are well known circuits that comprise power supplies, clocks, input/output interface circuitry and the like. Memory 210 may comprise random access memory, read only memory, removable disk memory, flash memory and various combinations of these and other types of memory.

The memory 210 also stores various software packages $212_n$ that dictate enhanced bridge component 200 functionality and operation including, but not limited to, assignment of port status and updating bridge programming in accordance with the subject invention. As such, the enhanced bridge component 200 becomes a special purpose machine when executing the steps of updating in accordance with the subject invention described in detail below.

The CPU 208 interfaces with the forwarding plane 202 via one or more buses or connections 214. When one or more of the software packages $212_n$ is executed, the control plane 204 is responsible for determining the state of each of the plurality of ports P1-P4. For example, the control plane 204 is ultimately responsible for deciding whether each port should be in a forwarding or blocking state. Additionally, protocols that initialize the pathways (i.e., loop free configuration of the network associated with the bridge component 200) also run in the control plane 204. In one embodiment of the invention, a spanning tree protocol (STP) is run in the control plane 204 to optimize traffic flow in the network 100 and provide the first state of operation of same. Accordingly, execution of one or more of the software packages $212_n$ provides signals that are provided via the bus 214 to the forwarding plane 202. Consequently, forwarding plane 202 acts upon the appropriate ports P1-P4 to put them in the appropriate physical state based upon the program instructions.

Figure 3:
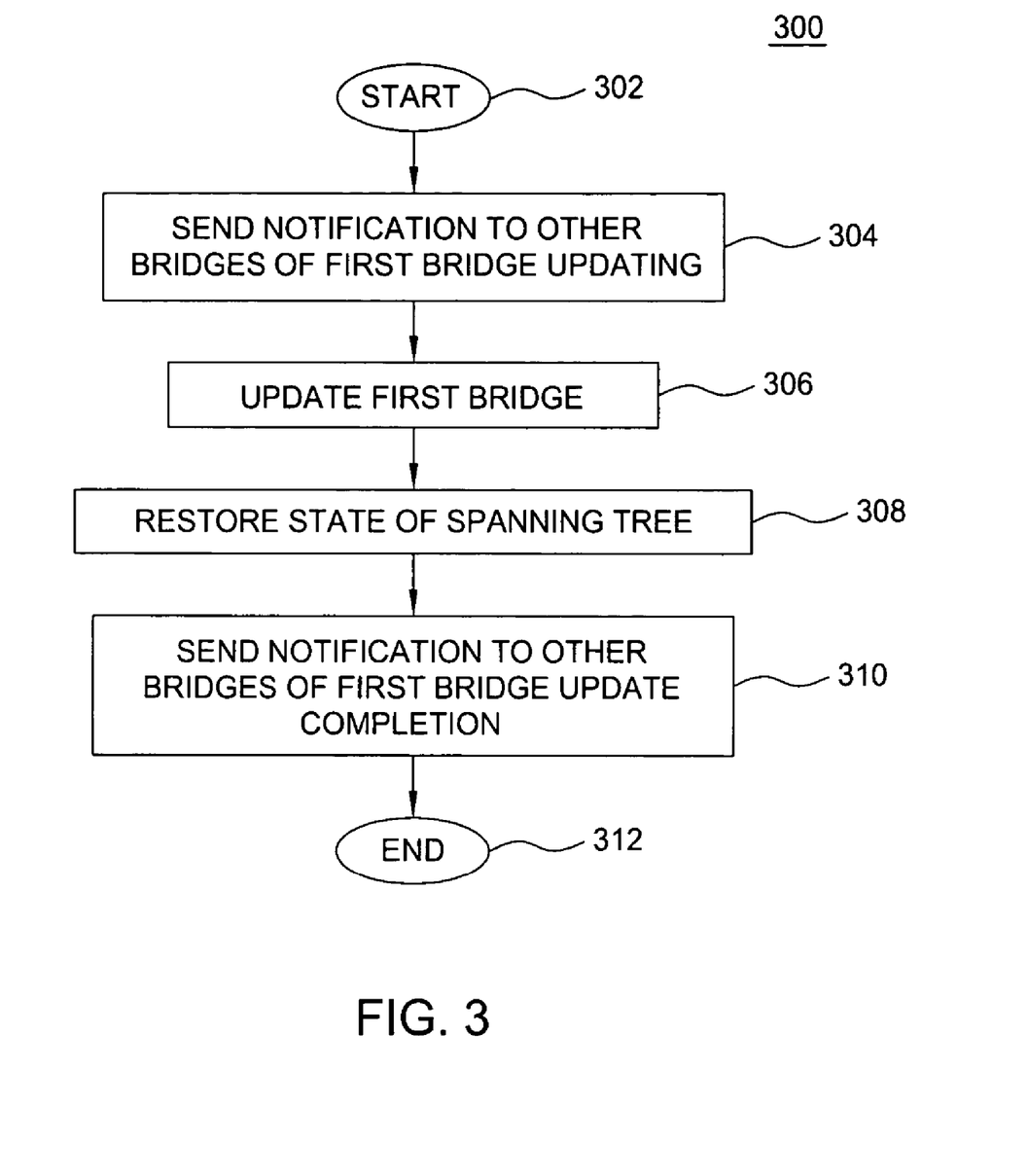
FIG. 3 depicts a series of method steps for updating a bridge in accordance with the subject invention.

FIG. 3 depicts a series of method steps 300 for updating a bridge component (i.e., a first bridge component) in accordance with the subject invention. For the purposes of this discussion, first bridge component of the method may be enhanced bridge component 200 described above operating in network 100 or other similar network having multiple bridges constructed and operating in the same manner as enhanced bridge component 200.

The method starts at step 302 and proceeds to step 304 whereby notification is sent to one or more second bridges associated with the first bridge to be updated. That is, if enhanced bridge component 200 is part of BLN 100 (e.g., replacing bridge C $106_C$), it will send a message to each of the other bridges (e.g., bridges $106_{A, B \& D}$), that this enhanced bridge 200 is scheduled for updating. As a result, the first state of network operation is disturbed.

In one example of step 304, the first bridge notifies neighboring bridges that it is going to be updated by sending a special Bridge Protocol Data Unit (BPDU). The special BPDU is sent along each of the forwarding links (i.e., links 108) connected to first bridge 200. In one particular embodiment of the subject invention where either an STP or rapid STP are used (in accordance with IEEE 802.1D and IEEE 802.1w, respectively), the special message is selected from the group consisting of a normal STP configuration BPDU (configBPDU) and an RSTP BPDU with a message age set to a special value (i.e., MAX age+1, which cannot happen during normal STP operation). In such a particular embodiment, a bridge receiving the special BPDU described will not expect any additional BPDUs at its "receiving" port for the bridge being identified as the updating bridge. That is, if port P3 of bridge D $106_D$ normally receives data from bridge C $106_C$, bridge D $106_D$ will no longer expect to receive data at port P3 after receiving the special BPDU from bridge C $106_C$. If the network is using an STP, the neighboring bridges (e.g., bridges $106_{A, B \& D}$) will generate the configBPDU themselves at specific time intervals that are expected during normal network operation (also known as a "hello time") and send such configBPDU via designated ports. For an RSTP configuration, the neighboring bridges already generate BPDUs at the designated hello times, but the bridges will not timeout. This can be accomplished by, for example, setting the parameter RCVD INFO WHILE to a larger value than currently set. For example, the RCVD INFO WHILE parameter is set to not expire before such neighboring bridge receives an "update completion" message sent by the first bridge (described in greater detail below). Consequently, neighboring portions of the spanning tree (i.e., bridges A, B & D and other network elements comprising the spanning tree) does not notice the upgrade.

At step 306, the actual updating of the first bridge (e.g., enhanced bridge component 200) is accomplished. For example, new software updates are integrated into one or more of the programs 212 or memory 210 of the first bridge based on instructions received from other portions of the network to which the first bridge is connected (in one example, BLN 100). During this update period, the forwarding plane 202 of the first bridge is temporarily fixed and the control plane 204 is temporarily disabled. That is, traffic continues to flow through the first bridge as all ports on this bridge are fixed to their state from before the reboot (i.e., the first state).

At step 308, the protocol that was being used to provide the state of ports P1-P4 of the first bridge is reactivated to restore the network to its first (loop-free) state. More specifically, and in one embodiment of the invention, when an STP used in the network of the first bridge is being updated, the STP restores the first bridge as an active network element to reestablish the spanning tree therein and the loop-free configuration of the network having the updated first bridge. The restoration can occur in two manners: via hardware port state retrieval or via software port state retrieval. More particularly and in one embodiment of the invention (presenting the hardware port state retrieval option), after the upgrade, the STP retrieves the hardware port state of each port from the forwarding plane 202 of the first bridge. The STP then waits for a predetermined period of time (identified as a waiting time) during which it may receive BPDUs. Then, based on, for example, IEEE 802.1D/w protocols, the STP reconstructs the software port state according to the following rules:

1. Each forwarding port is identified as either a root port or a designated port;
2. There is exactly one root port or there is no root port (in which case the first bridge is the root bridge);
3. A configBPDU/RSTP BPDU can only be received on the root port and on all blocking ports; and
4. All blocking ports are identified as alternate ports.

Depending on the received BPDUs during the waiting time, the bridge can restore its state or not. In a second embodiment of the invention, the software port states are retrieved directly (e.g., from non-volatile memory 210 in the first bridge 200). As such, no additional waiting time is necessary for the passing of network message to confirm port states.

If the following condition holds, the spanning tree changed during the upgrade. As a consequence, the bridge cannot restore its state. Therefore, the bridge will block all its ports and start advertising itself as root after the waiting time. The condition is a BPDU is received on more than one forwarding port (as this implies that there is at least one segment with two designated bridges). In any other case the bridge will restore its state.

The root port is the port on which the BPDU's are received. All other forwarding ports are designated ports. The bridge forwards the BPDUs via these ports. If the bridge received a BPDU on a blocking port, it compares the received information with its own information. If the bridge has better information, the port enters a transition phase to become a designated port. If during the waiting time no BPDU is received on a blocked port, that port enters a transition phase to become a designated port too. In other words, if no BPDU's are received, the bridge will make all of its forwarding ports into designated ports. The bridge will also consider itself as the root bridge. To summarize the above discussion, all ports update their variables based on information received in the BPDU from the root port except for blocked ports which have the opportunity to receive better (according to either the IEEE 802.1D or w standards) information. If no BPDU's were received, the ports will use the information of this bridge, which is now considered to be the root bridge.

Figure 4:
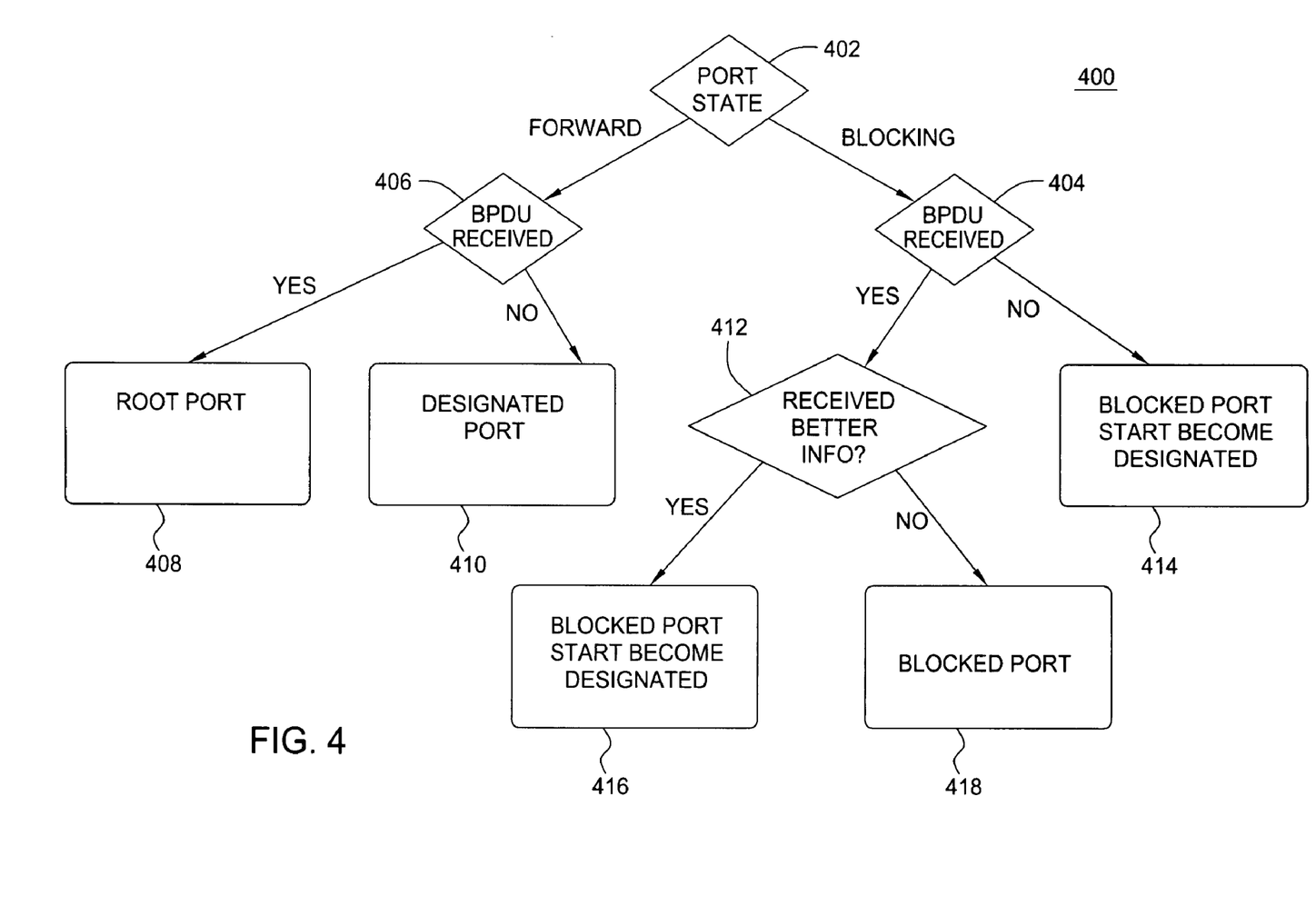
FIG. 4 depicts a decision tree for restoring bridge network status in accordance with the subject invention.

FIG. 4 depicts a decision tree 400 in accordance with the paths that may be taken by each port to determine its eventual status as the updated bridge is brought back into the network. Specifically, the decision tree starts at step 402 where the port state of a given port (e.g., port P1 of bridge component 200) is determined. If the port state is determined as forwarding, the decision tree 400 moves to step 406 where a BPDU is received and analyzed. If a BPDU is received during a given time while the port is in the forwarding state, this port is identified as a root port at step 408. If a BPDU is not received during this time, the port is identified as a designated port at step 410.

If the initial port state is identified as blocking, the decision tree 400 moves to step 404 where a determination of receipt of a BPDU is made. If a BPDU is received, the decision tree moves down to a second decision step at step 412. Specifically, a decision is entered as to whether information received by this most recent BPDU is better (according to either the IEEE 802.1D or w standards) than information previously received at that port. If the information is better, the decision tree moves to step 416 where the previously blocked port is identified as a designated port. If the received information is not better than the previous information, the decision tree moves to step 418 where the blocked port remains blocked. In an instance where a BPDU is not received at decision step 404, the decision tree moves to step 414 where the previously blocked port is identified as a designated port.

In the procedure above, the upgraded bridge is restoring its state based on the BPDUs it does or does not receive. In order to make the restoration of the state more reliable, the neighboring bridges could also send a message to the upgraded bridge, which contains extra information. This message could, for example, contain the port role of the neighboring port. If the neighbor port is a root port, then the role on the upgraded bridge should be designated. If the neighbor port is a designated port, then the role on the upgrading bridge should be either a blocked port or root port. Furthermore, this message could indicate if there was a reconfiguration during the upgrade. In this case the bridge should block all its ports and start advertising itself as root. Furthermore, the bridge can also store its state before upgrading and retrieve this stored state after the upgrade. However, this requires the use of non-volatile memory.

Returning to FIG. 3, at step 310, notification is sent to one or more bridges in the network to which the first bridge is associated that updating of the first bridge has been completed. In one embodiment of the invention, the first bridge sends the update messages to its neighboring bridge components (e.g., bridges A, B & D). The neighboring bridges know that the update is complete when they receive a normal BPDU. Normal means a BPDU according to IEEE802.1D or w. The neighboring bridges will always receive such a BPDU regardless if the first bridge could successfully restore its state or not. In the latter case, the first bridge would advertise itself as root in that BPDU and the first bridge defaults to the standard IEEE802.1D/w behavior of sending BPDUs on all its ports. In the former case where the bridge is able to restore its state, the bridge sends out BPDUs on all its designated ports according to the IEEE802.1D/w specification. The present invention requires the bridge to send out a BPDU on the root port as well (which does not happen in the IEEE802.1D/w standard) to notify the corresponding neighbor that the update is finished. The method ends at step 312.

It will be understood and appreciated that the series of method steps described herein with respect to FIG. 3 can be properly written as instruction code in one or more of the software packages $212_n$, or as ASIC contained within memory 210 of bridge component 200. As such, it is understood that the present invention provides a method to upgrade the control plane 204. So long as the update does not require changes to the forwarding plane 202 (i.e., physical changes to the hardware associated therewith). The method proceeds to update the control plane without affecting the forwarding plane 202.

In summary, the subject invention provides an elegant solution to updating the control plane. Various aspects of the subject invention provide improvements to the state of the art, especially when using an STP to create a loop free environment within the network. In a first aspect, an STP requires that BPDUs be exchanged between bridge components (such as first bridge component 200 and other bridge components such as 106$_n$) on a regular basis. If no BPDU is received after a predetermined time on a certain port, the bridge maintaining the status of said port will start a reconfiguration procedure. To avoid this reconfiguration procedure from occurring, bridges that receive the notification message of step 304 change their behavior. Specifically, and in one embodiment of the invention, nonupdating bridges that receive the special message or notification from the updating bridge no longer expect BPDUs from the bridge being updated.

In a second aspect, when an STP entity is activated, it assumes that it is not yet part of a spanning tree. If the forwarding plane remains operational and the control plane remains disabled as described above during the update, the updating bridge remains as part of the original STP after the restoration of step 308. As such, the bridge (operating within the original STP) needs only to restore its ports roles in the spanning tree instead of blocking all ports and advertising itself as a root.

A third aspect is that during the update procedure, the spanning tree may change due to some event somewhere else in the BLN 100 (e.g., one of the plurality of links 108 could fail thereby requiring a rerouting of data). This action requires the spanning tree to reconfigure itself to offer an appropriate pathway around the failed link. Since the updating bridge has no active control plane during execution of method steps 300, it cannot take part in the reconfiguration. Accordingly, and to account for this condition, if one of the second (non-updating) bridges notices a change in the spanning tree (such as the broken link example provided), such second bridge blocks the ports facing the bridge being updated (the first bridge 200). These special activities and features remain in effect until the second (nonupdating) bridge receives a notification message such as that sent out as step 310 of the method of the subject invention. That is, nonupdating bridges continue their behavior of, for example, not expecting BPDUs from the updating bridge ports placed in a blocking state and the like until such nonupdating bridge receives the notification of "end of upgrade" BPDU message. At such time of receiving the "end of upgrade" BPDU, the updating bridge or bridges return to their normal behavior.

Although various embodiments that incorporate the teachings of the present invention have been shown and described in detail herein, those skilled in the art can readily devise many other varied embodiments that still incorporate these teachings.

What is claimed is:

1. A method for rebooting a first bridge in a network, the network containing a plurality of bridges and operating according to a first state, the method comprising:
   a) sending notification to one or more second bridges in the network of the first bridge being scheduled for updating, thereby disturbing the first state;
   b) updating the first bridge after sending the notification;
   c) restoring the first state of the network; and
   d) sending notification to the one or more second bridges of the network that the updating of the first bridge has been completed;

wherein during the updating of the first bridge, a forwarding plane of the first bridge continues to operate, including maintaining states of ports, according to the first state of the network, and wherein restoring the first state of the network further includes reestablishing an original spanning tree that existed in the network prior to the update of the first bridge.

2. The method of claim 1, wherein the step of sending notification to the one or more second bridges of the first bridge being scheduled for updating further comprises the first bridge sending a special bridge protocol data unit (BPDU) along a plurality of forwarding links connected to the first bridge.

3. The method of claim 2, wherein the special BPDU is selected from a group consisting of a normal spanning tree protocol (STP) configuration and a rapid spanning tree protocol configuration.

4. The method of claim 3, wherein the special BPDU message for the normal STP configuration is configBPDU.

5. The method of claim 3, wherein the rapid spanning tree protocol (RSTP) BPDU has a message age set to a value that does not occur during the normal RSTP operation.

6. The method of claim 5, wherein the value is MAX age+1.

7. The method of claim 1, further comprising a step of the one or more second bridges initiating a condition of not expecting additional messages from the first bridge subsequent to the notification of the first bridge being scheduled for updating.

8. The method of claim 1, further comprising a step of disabling a control plane of the first bridge just prior to commencement of the updating.

9. The method of claim 1, wherein the reestablishing of the original spanning tree further comprises:
   c1) retrieving a port state of each port of the first bridge.

10. The method of claim 9 wherein if port states of the first bridge are retrieved via hardware, then the reestablishing of the original spanning tree further comprises:
    c2) waiting for a predetermined period of time to receive new network messages.

11. The method of claim 9, wherein if port states of the first bridge are retrieved via software, then no waiting period for new network messages occurs.

12. The method of claim 1, wherein the step of restoring the first state further comprises the first bridge blocking all of ports of the first bridge and advertising the first bridge as a root if a BPDU is received on more than one forwarding port.

13. The method of claim 7, wherein the initiated condition includes the one or more second bridges sending self-generated configBPDU messages.

14. The method of claim 1, wherein the step of sending notification to the one or more second bridges of the first bridge update completion further comprises the one or more second bridges receiving a normal BPDU from the first bridge.

15. A computer readable medium comprising memory containing a program which, when executed, performs an operation of rebooting a first bridge in a network, the network containing a plurality of bridges and operating according to a first state, the operation comprising:
   a) sending notification to one or more second bridges in the network of the first bridge being scheduled for updating, thereby disturbing the first state;
   b) updating the first bridge after sending the notification;
   c) restoring the first state of the network updated; and d) sending notification to the one or more second bridges of the network that the updating of the first bridge has been completed;

wherein during the updating of the first bridge, a forwarding plane of the first bridge continues to operate, including maintaining states of ports, according to the first state of the network, and wherein restoring the first state of the network further includes reestablishing an original spanning tree that existed in the network prior to the update of the first bridge.

16. The computer readable medium of claim 15, wherein the step of sending notification to the one or more second bridges of the first bridge being scheduled for updating further comprises the first bridge sending a special bridge protocol data unit (BPDU) along a plurality of forwarding links connected to the first bridge.

17. The computer readable medium of claim 15, wherein the special BPDU is selected from a group consisting of a normal spanning tree protocol (STP) configuration and a rapid spanning tree protocol configuration.

18. The computer readable medium of claim 17, wherein the special BPDU message for the normal STP configuration is configBPDU.

19. The computer readable medium of claim 17, wherein the rapid spanning tree protocol (RSTP) BPDU has a message age set to a value that does not occur during the normal RSTP operation.

20. The computer readable medium of claim 19, wherein the value is MAX age+1.

21. The computer readable medium of claim 15, wherein the operation further comprises a step of the one or more second bridges initiating a condition of not expecting additional messages from the first bridge subsequent to the notification of the first bridge being scheduled for updating.

22. The computer readable medium of claim 15, wherein the operation further comprises a step of disabling a control plane of the first bridge just prior to commencement of the updating.

23. The computer readable medium of claim 15, wherein the step of sending notification to the one or more second bridges of the first bridge update completion further comprises the one or more second bridges receiving a normal BPDU from the first bridge.

24. An apparatus for updating a first network bridge in a plurality of interconnected network bridges operating according to a first state comprising:

a forwarding plane configured to provide physical control of states of a plurality of ports in the first bridge; and a control plane comprising a CPU configured for issuing and executing instructions that control physical actions of the forwarding plane including:

a) sending notification to one or more second bridges in the network of the first bridge being scheduled for updating, thereby disturbing the first state;

b) updating first bridge after sending the notification;

c) restoring the first state of the network; and d) sending notification to the one or more second bridges of the network that the updating of the first bridge has been completed;

wherein during the updating of the first bridge, a forwarding plane of the first bridge continues to operate, including maintaining states of ports, according to the first state of the network, and wherein restoring the first state of the network further includes reestablishing an original spanning tree that existed in the network prior to the update of the first bridge.

25. The apparatus of claim 24, wherein the step of sending notification to the one or more second bridges of the first bridge being scheduled for updating further comprises the first bridge sending a special bridge protocol data unit along a plurality of forwarding links connected to first bridge.

* * * * *

UNITED STATES PATENT AND TRADEMARK OFFICE
CERTIFICATE OF CORRECTION

PATENT NO. : 7,636,774 B2 Page 1 of 1
APPLICATION NO. : 10/780509
DATED : December 22, 2009
INVENTOR(S) : van Haalen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1710 days.

Signed and Sealed this

Twenty-first Day of December, 2010

David J. Kappos
*Director of the United States Patent and Trademark Office*